United States Patent
Chrobaczek et al.

(10) Patent No.: US 7,732,536 B2
(45) Date of Patent: Jun. 8, 2010

(54) COMBINATION OF AMINOFUNCTIONAL AND ACRYLATOFUNCTIONAL POLYORGANOSILOXANES

(75) Inventors: Harald Chrobaczek, Augsburg (DE); Theodor Angele, Wertingen (DE); Jochen Dauth, Burghausen (DE)

(73) Assignee: Huntsman Textile Effects (Germany) GmbH, The Woodlands, TX (US)

( * ) Notice: Subject to any disclaimer, the term of this patent is extended or adjusted under 35 U.S.C. 154(b) by 473 days.

(21) Appl. No.: 11/815,920

(22) PCT Filed: Feb. 1, 2006

(86) PCT No.: PCT/EP2006/000833
§ 371 (c)(1),
(2), (4) Date: Aug. 9, 2007

(87) PCT Pub. No.: WO2006/084606
PCT Pub. Date: Aug. 17, 2006

(65) Prior Publication Data
US 2008/0015300 A1  Jan. 17, 2008

(30) Foreign Application Priority Data
Feb. 12, 2005  (EP) ................ 05003013

(51) Int. Cl.
*C08L 83/12* (2006.01)
*D06M 15/647* (2006.01)

(52) U.S. Cl. .......... 525/477; 524/837; 524/838; 528/25; 528/31; 528/38; 252/8.61

(58) Field of Classification Search .......... None
See application file for complete search history.

(56) References Cited

U.S. PATENT DOCUMENTS

| | | | | |
|---|---|---|---|---|
| 4,584,337 A | * | 4/1986 | Lee et al. | 524/500 |
| 4,698,406 A | | 10/1987 | Lo et al. | |
| 4,906,718 A | * | 3/1990 | Gornowicz et al. | 528/15 |
| 5,300,237 A | | 4/1994 | Ona et al. | |
| 5,593,787 A | | 1/1997 | Dauth et al. | |
| 5,739,192 A | | 4/1998 | Blizzard et al. | |
| 5,869,726 A | | 2/1999 | Dauth et al. | |
| 6,177,511 B1 | | 1/2001 | Dauth et al. | |
| 6,585,985 B2 | * | 7/2003 | Sakuta | 424/401 |
| 6,867,246 B2 | * | 3/2005 | Nowak et al. | 523/109 |

FOREIGN PATENT DOCUMENTS

| | | | |
|---|---|---|---|
| EP | 0267004 | | 5/1988 |
| EP | 0475363 | | 3/1992 |
| EP | 0716114 | | 6/1996 |
| EP | 0834527 | | 4/1998 |
| EP | 0933399 | | 8/1999 |
| EP | 0972811 | | 1/2000 |
| EP | 1020491 | | 7/2000 |
| WO | WO 98/27174 | | 6/1998 |
| WO | WO 99/15263 | | 4/1999 |
| WO | WO 2006/073695 | * | 7/2006 |

OTHER PUBLICATIONS

"Romp Chemie Lexikon," Georg Thieme Verlag Stuttgart, New York, 9$^{th}$ Edition, 1990, p. 1666.

* cited by examiner

*Primary Examiner*—Marc S Zimmer

(57) ABSTRACT

Compositions which comprise aminofunctional polyorganosiloxanes and additionally polyorganosiloxanes are described which can be prepared by reacting polysiloxanes with Si—H bonds (H-siloxanes) and specific compounds with carbon—carbon multiple bonds. The last-mentioned compounds comprise acrylate units. The compositions are suitable for the treatment of fabrics, to which advantageous properties are hereby imparted.

14 Claims, No Drawings

COMBINATION OF AMINOFUNCTIONAL AND ACRYLATOFUNCTIONAL POLYORGANOSILOXANES

CROSS REFERENCE TO RELATED APPLICATIONS

This application is the National Phase of International Application PCT/EP2006/000833 filed Feb. 1, 2006 which designated the U.S. and which claims priority to European Pat. App. No. 05003013.9 filed Feb. 12, 2005. The noted applications are incorporated herein by reference.

The invention relates to compositions which comprise both polysiloxanes with amino groups and polysiloxanes with acrylato groups. The compositions can be in the form of an aqueous dispersion. The invention further relates to the use of such compositions or dispersions for treating fiber materials.

It is known to treat fiber materials, such as, for example, fabrics in the form of wovens or knits, with aminofunctional polyorganosiloxanes in order to impart advantageous properties to the textiles. This is described in a large number of publications.

Also known are polyorganosiloxanes which comprises acrylate units. This is evident, inter alia, from EP-A 834 527, EP-A 972 811, WO 98/27174, EP-A 716 114 and EP-A 1 020 491. Finally, EP-A 933 399 describes polyorganosiloxanes which are obtained by a Michael addition-like reaction from aminofunctional polysiloxanes and diacrylates or oligoacrylates.

If fabrics are treated with polyorganosiloxanes known from the prior art, e.g. in the course of a padding process, then it is found that in so doing optimum results are still not achieved. In particular, the hydrophilic properties and/or the so-called "appearance-after-washing" properties of cellulose-containing textiles often do not achieve the desired level. The appearance-after-washing (AAW) properties reflect the crease behavior of washed textiles. In the case of textiles made of cellulose, e.g. cotton, it has been found that if they are finished with a combination of conventional cellulose crosslinkers and known polyorganosiloxanes in accordance with a known dry crosslinking process, the AAW effects achieved are not as after a wet crosslinking process.

The object of the present invention was to provide compositions which are exceptionally suitable for treating fiber materials, e.g. fabrics, and impart excellent properties to these fiber materials. In particular, the object was to provide compositions which, in combination with conventional cellulose crosslinkers, enable similarly good AAW properties to be imparted to textiles containing cellulose by means of a dry crosslinking process as can be achieved by wet crosslinking processes using formulations from the prior art.

The object was achieved by a composition which comprises at least the components A and B and/or a product which is formed by the chemical reaction between component A and component B, where component A is a polyorganosiloxane which comprises one or more amino groups and where component B is a polyorganosiloxane which is obtainable by reacting an unsaturated compound of the formula (I) or of the formula (II)

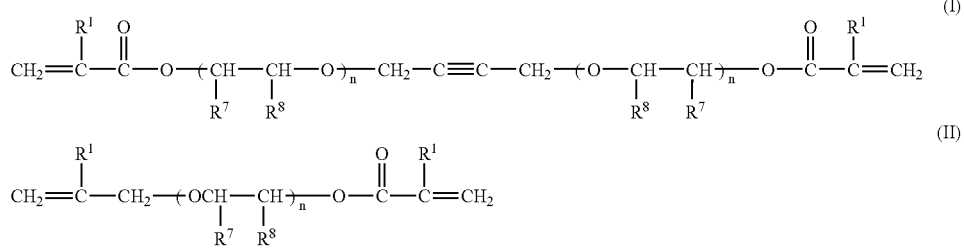

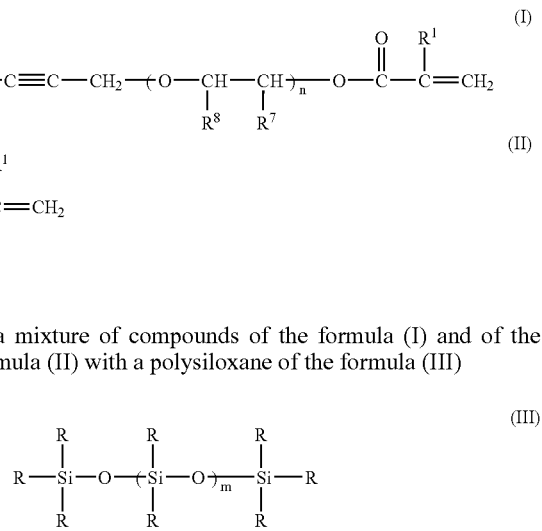

or a mixture of compounds of the formula (I) and of the formula (II) with a polysiloxane of the formula (III)

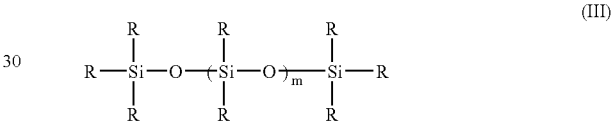

or a mixture of such polysiloxanes in quantitative ratios such that the sum of the number of Si—H groups in the polysiloxanes of the formula (III) used is essentially just as great as the sum of the number of carbon-carbon double bonds and the number of carbon-carbon triple bonds in the compounds of the formula (I) and (II) used, where $R^1$ is H or $CH_3$, all of the radicals R present, independently of one another, are hydrogen or an alkyl radical having 1 to 4 carbon atoms, but where at least 2 of all of the radicals R present are hydrogen and where two radicals R bonded to the same silicon atom are not hydrogen at the same time, where m is a number from 10 to 50, n is a number from 0 to 20, preferably from 2 to 20, where in each unit

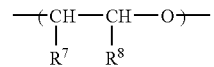

one of the radicals $R^7$ and $R^8$ is hydrogen and the other is hydrogen or a methyl group.

The abovementioned compositions according to the invention can be used in a very advantageous manner for treating fiber materials and imparting hydrophilic properties and good AAW properties to them. The fiber materials are preferably fabrics in the form of wovens, knits or nonwovens. In the case of textiles containing cellulose fibers, e.g. cotton fibers, in particular, treatment with compositions according to the invention in combination with known cellulose crosslinkers leads to a high level of crease resistance (AAW). Suitable cellulose crosslinkers are the products known to the person skilled in the art, in particular N,N'-dimethyloldihydroxyethyleneurea (DMDHEU), accessible from urea and glyoxal and subsequent methylolation with formaldehyde, or etherified, e.g. completely or partially etherified with methanol, DMDHEU. A series of cellulose crosslinker formulations is obtainable under the trade name KNITTEX® from Ciba Spezialitätenchemie Pfersee GmbH, Germany.

It is advantageous to use the compositions according to the invention in the form of aqueous dispersions for treating the fabrics made of fiber materials. The application can take place in this case in the form of a known padding process. Following application, the fabrics are dried in the usual way and, if appropriate, then condensed at further elevated temperature in a known manner.

If the compositions according to the invention in the preferred embodiment are present in the form of aqueous dispersions, then, besides the components A and B listed above, these also comprise water as component C and an auxiliary as component D. In this connection, this auxiliary is chosen from the group which includes one or more dispersants, polyvinyl alcohol (PVA) and guar meal (GuM) or mixtures of 2 or more of the specified products. It is advantageous here if the dispersion comprises the components A to D in the following quantitative ratios relative to one another A 5 to 20 parts by weight B 2 to 5 parts by weight C 50 to 80 parts by weight D 2 to 10 parts by weight Prior to application to fabrics, these dispersions can be diluted with water to customary concentrations, and further agents customary for textile finishing may be added.

Dispersants which can be used are standard commercial surface-active products. Nonionogenic surfactants, such as ethoxylated alcohols or ethoxylated fatty acids, are highly suitable, as are cation-active surfactants, such as quaternary ammonium salts.

Instead of dispersants or in addition to them it is possible to use polyvinyl alcohol (PVA) and/or guar meal (GuM) as auxiliary (component D), although this of course does not mean that every auxiliary from the specified group is suitable in each arbitrary individual case. The auxiliary can also comprise PVA besides dispersant(s) and/or GuM or consist only of PVA. In this case, preference is given to using PVA with an average molecular weight in the range from 25 000 to 100 000.

Besides dispersant(s) and/or PVA, the auxiliary can likewise also comprise GuM or consist only of GuM. For this purpose, preference is given to using GuM which is characterized by the following data: viscosity of a 1% solution at 25° C.: 3.5-3.7 Pa·s (3500-3700 cP) average particle size: about $75 \cdot 10^{-6}$ m. GuM is commercially available, e.g. from Worlée-Chemie GmbH, Germany. Guar meal (GuM) is a product known from the literature, see e.g. "Römpp Chemie Lexikon", Georg Thieme Verlag Stuttgart, New York, 9th Edition, 1990, page 1666. In the case of dispersions according to the invention, PVA and GuM can bring about increased stability of the aqueous dispersion by acting as protective colloid.

Compositions according to the invention can also be used advantageously for household laundry, e.g. as additive to fabric softeners during the washing of textiles in domestic washing machines. This can be carried out by customary methods and with customary additives.

A particularly preferred embodiment of dispersions according to the invention consists in using a mixture which comprises one or more cation-active dispersants and additionally PVA and/or GuM as auxiliary during their preparation. Highly suitable cationic-active dispersants here are the products already specified above.

Besides the specified components A, B, C and D, dispersions according to the invention can also comprise further components in amounts known to the person skilled in the art, e.g. the cellulose crosslinkers already mentioned, waxes, fluorine-comprising polymers, further polysiloxanes and/or flame retardants.

The compositions according to the invention comprise a component A and a component B, which represents a very specific polyorganosiloxane.

Instead of components A and B or in addition to them, dispersions according to the invention can also comprise a product which is formed by a chemical reaction between component A and component B.

Component A is a polyorganosiloxane which comprises one or more amino groups. These are preferably primary and/or secondary amino groups. Such aminofunctional polyorganosiloxanes are known standard commercial products which can be obtained, inter alia, from the companies Wacker, Germany, and Dow Corning. Such aminofunctional polyorganosiloxanes can often already be commercially obtained in the form of aqueous dispersions. The amino groups of component A are preferably located in side chains of the polysiloxane chain, but can also be bonded to the terminal silicon atoms of the chain.

Aminofunctional polyorganosiloxanes (component A) can be prepared by methods which are known to the person skilled in the art from the prior art. One option consists, for example, in reacting, via a known equilibrium reaction, linear and/or cyclic oligo- or polydialkylsiloxanes with silanes of the formula (VIII) in the presence of alkaline catalysts, $$(R^5)Si(OR^{10})_2Z \quad (VIII)$$

where Z has the meaning explained below, $R^5$ is OH, $OR^3$ or is $R^3$, where $R^3$ is an alkyl radical having 1 to 4 carbon atoms and where $R^{10}$ is $CH_3$ or $CH_2$—$CH_3$.

A further option, likewise known from the literature, for preparing aminofunctional polyorganosiloxanes (component A) consists in adding polyorganosiloxanes ("H-siloxanes") which comprise Si—H bonds onto the C=C double bond of allylamines or allyl halides where, if using allyl halides, the halogen atom is then substituted by reaction with an amine.

Polyorganosiloxanes which are particularly highly suitable as component A have a structure according to formula (IV)

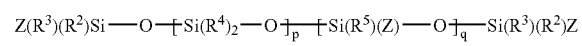

(IV)

where the units —Si($R^5$)(Z)—O— and —Si($R^4$)$_2$—O— present may be distributed arbitrarily over the polysiloxane chain, where the ratio p:q is in the range from 3:1 to 130:1, all of the radicals Z present, independently of one another, are $R^3$ or are a radical of the formula (V), but at least one of the radicals Z is a radical of the formula (V)

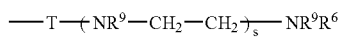

(V)

where all of the radicals $R^2$ present are $R^3$, but preferably are $OCH_3$, $OC_2H_5$ or OH, s has the value 0, 1 or 2 and all of the radicals $R^5$ present are OH, $OR^3$ or $R^4$, all of the radicals $R^3$ present are an alkyl radical having 1 to 4 carbon atoms, all of the radicals $R^4$ present are $R^3$ or are a radical of the formula (VI),

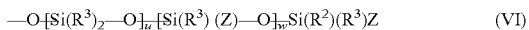
$$-O-[Si(R^3)_2-O]_u-[Si(R^3)(Z)-O]_w-Si(R^2)(R^3)Z \quad (VI)$$

all of the radicals $R^9$ present, independently of one another, are hydrogen or are $R^3$, all of the radicals $R^6$ present are hydrogen or are an alkyl radical having 1 to 12 carbon atoms or are a radical of the formula (VII)

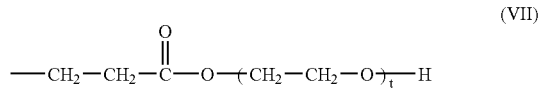
$$-CH_2-CH_2-\overset{O}{\underset{\|}{C}}-O-(CH_2-CH_2-O)_t-H \quad (VII)$$

where the ratio u:w is in the range from 3:1 to 130:1 and where the values of p, q, u and w are chosen so that component A comprises, on average, 50 to 800 silicon atoms, where t is a number from 2 to 20, where T is a divalent linear or branched alkylene radical having 1 to 4 carbon atoms, where some or all of the nitrogen atoms present in the radicals Z may be in quaternized form.

Particularly highly suitable components A are polysiloxanes of the formula (IV) in which all of the radicals Z present at the chain ends are a radical $R^3$ and at least one of the radicals Z which is located in units of the formula

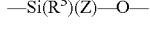
$$-Si(R^5)(Z)-O-$$

is a radical of the formula

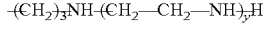
$$-(CH_2)_3-NH-(CH_2-CH_2-NH)_yH$$

or of the formula

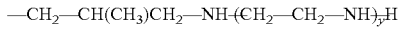
$$-CH_2-CH(CH_3)CH_2-NH-(CH_2-CH_2-NH)_yH$$

in which y has either the value 0 or 1.

The component B of compositions according to the invention is a specific polyorganosiloxane. Such a polyorganosiloxane can be prepared by reacting a compound of the formula (I) or formula (II)

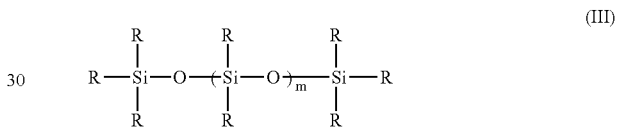

with a polyorganosiloxane of the formula (III)

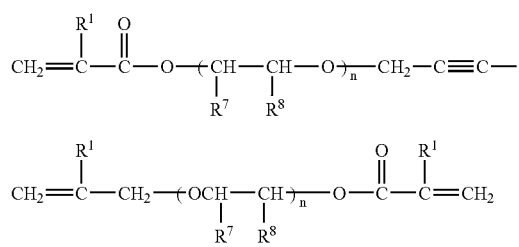

Instead of a single compound of the formula (I) or of the formula (II), it is also possible to use a mixture of such compounds. A mixture of polysiloxanes of the formula (III) can also likewise be used. This reaction has to take place in quantitative ratios such that the sum of the number of Si—H groups in the polyorganosiloxanes of the formula (III) used is approximately as great as the sum of the number of C≡C triple bonds in the compounds of the formula (I) or the number of C═C double bonds in the compounds of the formula (II).

An acrylatofunctional polysiloxane suitable as component B is obtainable from Wacker-Chemie GmbH, Germany.

The compounds of the formula (I) can be prepared by alkoxylation of butynediol (1,4) and subsequent esterification with acrylic acid or methacrylic acid or transesterification of esters of these acids with butynediol (1,4) or alkoxylated butynediol (1,4) by known methods. If n in formula (I) has the value 0, the alkoxylation is naturally omitted.

The compounds of the formula (II) can be obtained by alkoxylation of (meth)allyl alcohol and subsequent esterification or transesterification, as described above using the example of butynediol, where again if n=0, the alkoxylation is omitted.

Polyorganosiloxanes of the formula (III)

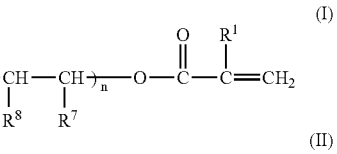

are products in which, per molecule, on average at least 2 of the radicals R are hydrogen, but 2 hydrogen atoms are not bonded to the same silicon atom.

The value of m in formula (III) is in the range between 10 and 50.

The reaction of polysiloxanes of the formula (III) with compounds of the formula (I) or of the formula (II) preferably takes place in the presence of a catalyst or of a mixture of a mixture of catalysts.

Suitable reaction conditions and catalysts for these reactions in which an Si—H unit is in each case added onto a C—C multiple bond are stated in the literature cited at the beginning (EP and WO specifications).

Compositions according to the invention are preferably used in the form of aqueous dispersions, as is customary in textile finishing. The type and amount of the components of these dispersions have already been described above.

Aqueous dispersions of compositions according to the invention can be prepared by known methods, e.g. by mixing the components A and B and stirring into a mixture of water and auxiliary, if appropriate followed by a high-pressure homogenization.

A preferred method of producing aqueous dispersions of compositions according to the invention involves the following successive steps a) to e):

a) Preparation of a mixture from components A and B.

b) Dissolution of the mixture prepared in step a) in an anhydrous organic solvent, of which not more than 5 g are soluble in 100 g of water at room temperature.

c) Mixing the solution obtained in step b) with water or an aqueous solution of an acid.

d) Homogenization of the mixture obtained in step c), preferably using high-pressure homogenization.

e) Removal of 90 to 100% of the organic solvent used in step b), where step a) and/or step c) are carried out with co-use of an auxiliary which is chosen from the group which includes a dispersant or a mixture of dispersants, polyvinyl alcohol (PVA) and guar meal (GuM).

Step b):

In this process step, a solution of the mixture prepared according to step a) in an organic solvent is prepared. It is also possible to use a mixture of two or more organic solvents. Such mixtures are likewise referred to below as "organic solvent". If appropriate, the preparation of the solution is carried out at elevated temperature.

The organic solvent used for step b) must be anhydrous. This does not mean that it must not contain any water at all, but the water content of this solvent must not be higher than 2% by weight. Of course, the polyorganosiloxane used and the compounds of the formula (I) and the formula (II) used should not comprise more than 2% by weight of water either.

Moreover, the solvent used should have only a low solubility in water. At room temperature, this solubility should not be greater than 5 g of solvent in 100 g of water.

Suitable solvents are higher alcohols, esters, ketones, e.g. dialkyl ketones, but also aromatic hydrocarbons, such as toluene or xylene, provided they satisfy the abovementioned conditions and the polyorganosiloxane (mixture) used and the compound of the formula (I) or of the formula (II) used are soluble in the solvent in the desired concentration, where, for the dissolution, if appropriate elevated temperature may be required.

With regard to process step e) (removal of at least 90% of the solvent), preference is given to using those solvents which can be readily removed from the dispersions prepared in step d). A simple method of doing this is distillation, if appropriate under reduced pressure. Solvents which can be removed to at least 90% in this way include solvents with a boiling point of less than 100° C. at room temperature, solvents which form an azeotrope with water or solvents which have a higher vapor pressure than water at reduced pressure. Particularly highly suitable solvents are methyl isobutyl ketone and n-butyl acetate; both can be removed easily by distillation in step e) as an azeotrope with water.

In step c), either only water or an aqueous solution of an acid can be mixed with the solution obtained in step b). Suitable acids are, in particular, sulfuric acid, hydrochloric acid or carboxylic acids having 1 to 6 carbon atoms, e.g. acetic acid. If acid is used, the aqueous solution of the acid should have a pH in the range from 3 to 6.5 at 20° C.

In step d), the mixture which was obtained after step c) is subjected to a homogenization. This can take place by means of stirring, if appropriate at elevated temperature. However, a high-pressure homogenization is often advantageous.

The high-pressure homogenization is preferably carried out at a pressure in the range from 50 to 1000 bar, a particularly favorable range is 50 to 350 bar. The pressure can be adjusted and controlled in a targeted manner in a series of known apparatuses of the type described below. Details of devices and methods for high-pressure homogenization can be found in WO 99/15263.

Of suitability for carrying out the high-pressure homogenization according to process step d) are Gaulin instruments from Manton-Gaulin Corp. USA or from APV-Deutschland GmbH, Lübeck, Germany, e.g. the model "Gaulin homogenizer LAB 60-7 TBS" or the MC models from this company. Also suitable are instruments of the "microfluidizer" series from Microfluidics, USA.

Step e):

The last step of the process by which dispersions according to the invention can be prepared consists in removing 90% to 100% of the amount of solvent used for step b). The partial or complete removal of the solvent can be carried out by known methods. Normally, a distillation is expedient. By selecting suitable solvent properties it is possible, as described above, to make removal by distillation possible.

It is advantageous if the solution of the components A and B prepared in step b) in an organic solvent comprises 5 to 50% by weight, preferably 10 to 40% by weight, of polyorganosiloxanes. These numbers refer to the sum of all of the polyorganosiloxanes used.

The invention is illustrated below by working examples.

EXAMPLE 1

Preparation of an aqueous dispersion of a component B.

50 g of a tetraacrylatofunctional polydimethylsiloxane with a viscosity of from 100 to 150 mPa·s at 25° C. (corresponding to component B) are dissolved at room temperature in 100 g of methyl isobutyl ketone. The resulting solution is then mixed with a composition which comprises 185 g of water
10 g of dipropylene glycol
13 g of a mixture of nonionogenic and cationic dispersants
7 g of a C13 alcohol
and
0.8 g of phosphoric acid.

The mixture is then homogenized by means of stirring and then a pre-emulsion is prepared using high-pressure emulsification. The majority of the organic solvent is removed from this pre-emulsion by distillation. This gives a stable, yellow-colored aqueous dispersion. This dispersion comprises no aminofunctional polysiloxane.

EXAMPLE 2

Preparation of an aqueous dispersion which comprises an aminofunctional polysiloxane (component A) and an acrylatofunctional polysiloxane (component B).

At room temperature, the following are mixed together:

10 g of the dispersion prepared according to Example 1 (comprising component B)

50 g of a commercial aqueous dispersion of an aminofunctional polyorganosiloxane (This dispersion comprises about 35% by weight of polysiloxane, which acts as component A, 60% by weight of water and about 4% nonionogenic dispersants).

EXAMPLE 3

Preparation of an aqueous dispersion which comprises a product which is formed by a chemical reaction between an aminofunctional polyorganosiloxane (component A) and an acrylatofunctional polyorganosiloxane (component B).

In 300 g of methyl isobutyl ketone (MIBK) are dissolved
22.5 g of tetraacrylatofunctional polysiloxane with a viscosity of from 100 to 150 mPa·s at 25° C. (component B)
78 g of an aminofunctional polydimethylsiloxane which comprises N-aminoethyl-3-aminopropyl side chains (component A).

To this solution is added a mixture which consists of
20 g of a mixture of nonionogenic and cationic dispersants
20 g of 1,2-propylene glycol
6 g of 60% acetic acid
560 g of water.

Then, firstly by stirring, then by means of high-pressure homogenization at 60° C./10 minutes, an aqueous dispersion is prepared which still comprises MIBK. The latter is largely removed by distillation at about 70° C. and under reduced pressure.

This gives a stable, opalescent dispersion.

EXAMPLE 4

Fabric made of 100% cotton is treated with aqueous liquors using a padding process. The fabric is then squeezed, as usual, dried for 10 minutes at 110° C. and then cured for 5 minutes at 150° C. The fabric treated in this way is washed 3 times at 60° C. The crease behavior is then determined in accordance with the method described in DIN EN ISO 15487 (edition from February 2002).

The aqueous liquors used here are:
Liquor a): 60 g/l of dispersion as in Example 2
40 g/l of a standard commercial cellulose crosslinker
(KNITTEX® FEL, Ciba Spezialitätenchemie Pfersee GmbH, Germany)
24 g/l of a standard commercial catalyst formulation for cellulose crosslinking
(KNITTEX® CATALYST MO,
Ciba Spezialitätenchemie Pfersee GmbH, Germany)
1 ml/l of 60% strength acetic acid
Liquor b): as liquor a) but without
60 g/l of dispersion from Example 2,
and instead with 45 g/l of dispersion as in Example 3
Liquor c): as liquor b) but with 90 g/l of dispersion instead of 45 g/l
Liquor d): (comparison, not in accordance with the invention):
as liquor a), but with 60 g/l of the dispersion of the aminofunctional polysiloxane which is used for Example 2. Liquor d) thus comprises a component A), but not a component B).

The values of the crease properties found after washing 3 times using the specified DIN method are given in the table below. Here, a higher value of the grade for the crease behavior means better crease resistance.

|  | Crease behavior Grade |
| --- | --- |
| Liquor a) | 3.0 |
| Liquor b) | 2.5 |
| Liquor c) | 3.5 |
| Liquor d) (comparison) | 1.5 |

What is claimed is:

1. A composition comprising components A and B and/or a product which is formed by the chemical reaction between component A and component B, where component A is a polyorganosiloxane which comprises one or more amino groups and where component B is a polyorganosiloxane obtained by reacting an unsaturated compound of the formula (I) or of the formula (II)

$$CH_2=\overset{R^1}{\underset{}{C}}-\overset{O}{\underset{}{C}}-O-(CH-CH-O)_n-CH_2-C\equiv C-CH_2-(O-CH-CH)_n-O-\overset{O}{\underset{}{C}}-\overset{R^1}{\underset{}{C}}=CH_2 \quad (I)$$
$$\phantom{CH_2=C-C-O-(}R^7\phantom{-}R^8 \phantom{XXXXXXXXXXXXXXXXX} R^8\phantom{-}R^7$$

$$CH_2=\overset{R^1}{\underset{}{C}}-CH_2-(OCH-CH)_n-O-\overset{O}{\underset{}{C}}-\overset{R^1}{\underset{}{C}}=CH_2 \quad (II)$$
$$\phantom{CH_2=C-CH_2-(}R^7\phantom{-}R^8$$

or a mixture of compounds of the formula (I) and of the formula (II) with a polysiloxane of the formula (III)

$$R-\underset{\underset{R}{|}}{\overset{\overset{R}{|}}{Si}}-O-(\underset{\underset{R}{|}}{\overset{\overset{R}{|}}{Si}}-O)_m-\underset{\underset{R}{|}}{\overset{\overset{R}{|}}{Si}}-R \quad (III)$$

or a mixture of the polysiloxanes of formula (III) in quantitative ratios such that the sum of the number of Si—H groups in the polysiloxanes of the formula (III) used is essentially just as great as the sum of the number of alkenyl carbon—carbon double bonds and the number of carbon—carbon triple bonds in the compounds of the formula (I) and (II) used, where $R^1$ is hydrogen or $CH_3$, all of the radicals R present, independently of one another, are hydrogen or an alkyl radical having 1 to 4 carbon atoms, but where at least 2 of all of the radicals R present are hydrogen and where two radicals R bonded to the same silicon atom are not hydrogen at the same time, where m is a number from 10 to 50, n is a number from 0 to 20, where in each unit

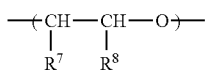

one of the radicals $R^7$ and $R^8$ is hydrogen and the other is hydrogen or a methyl group.

2. An aqueous dispersion comprising
   (i) components A and B and/or a product which is formed by the chemical reaction between component A and component B,
   (ii) component C and
   (iii) component D
   where component A is a polyorganosiloxane which comprises one or more amino groups and where
   component B is a polyorganosiloxane obtained by reacting an unsaturated compound of the formula (I) or of the formula (II)

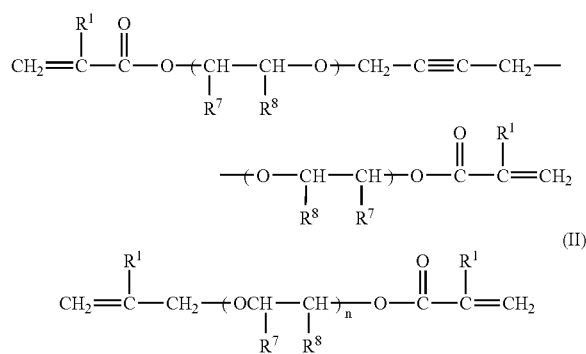

or a mixture of compounds of the formula (I) and of the formula (II) with a polysiloxane of the formula (III)

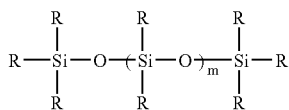

or a mixture of the polysiloxanes of formula (III) in quantitative ratios such that the sum of the number of Si—H groups in the polysiloxanes of the formula (III) used is essentially just as great as the sum of the number of alkenyl carbon—carbon double bonds and the number of carbon—carbon triple bonds in the compounds of the formula (I) and (II) used,
   where
   $R^1$ is hydrogen or $CH_3$,
   all of the radicals R present, independently of one another, are hydrogen or an alkyl radical having 1 to 4 carbon atoms, but where at least 2 of all of the radicals R present are hydrogen and where two radicals R bonded to the same silicon atom are not hydrogen at the same time,
   where
   m is a number from 10 to 50,
   n is a number from 0 to 20, where in each unit

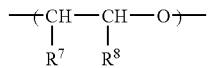

one of the radicals $R^7$ and $R^8$ is hydrogen and the other is hydrogen or a methyl group,
   and where component C is water and component D is an auxiliary selected from the group consisting of one or more dispersants, polyvinyl alcohol, guar meal and a mixture of one or more dispersants and/or polyvinyl alcohol and/or guar meal.

3. The dispersion according to claim 2, which comprises in the following quantitative ratios relative to one another 5 to 20 parts by weight of component A, 2 to 5 parts by weight of component B, 50 to 80 parts by weight of component C and 2 to 10 parts by weight of component D.

4. The dispersion according to claim 2, wherein component A is a polyorganosiloxane which has a structure according to formula (IV)

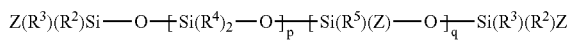

where the units $—Si(R^5)(Z)—O—$ and $—Si(R^4)_2—O—$ present are distributed arbitrarily over the polysiloxane chain,
   where
   the ratio p:q is in the range from 3:1 to 130:1,
   all of the radicals Z present, independently of one another, are $R^3$ or are a radical of the formula (V), but at least one of the radicals Z is a radical of the formula (V)

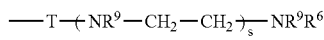

where
   all of the radicals $R^2$ present are $R^3$, $OCH_3$, $OC_2H_5$ or OH,
   s has a value of 0, 1 or 2,
   all of the radicals $R^5$ present are OH, $OR^3$ or $R^4$,
   all of the radicals $R^3$ present are an alkyl radical having 1 to 4 carbon atoms,
   all of the radicals $R^4$ present are $R^3$ or are a radical of the formula (VI),

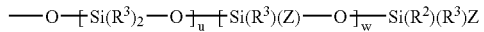

all of the radicals $R^9$ present, independently of one another, are hydrogen or are $R^3$,
   all of the radicals $R^6$ present are hydrogen or are an alkyl radical having 1 to 12 carbon atoms or are a radical of the formula (VII)

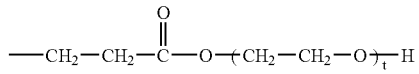

where the ratio u:w is in the range from 3:1 to 130:1
   and where the values of p, q, u and w are chosen so that component A comprises, on average, 50 to 800 silicon atoms, where t is a number from 2 to 20, where T is a divalent linear or branched alkylene radical having 1 to 4 carbon atoms, and where one or more of the nitrogen atoms present in the radicals Z may be in quaternized form.

5. The dispersion according to claim 4, wherein all of the radicals Z located at the chain ends of component A are a radical $R^3$.

6. The dispersion according to claim 4 wherein $R^2$ is $OCH_3$, $OC_2H_5$ or OH.

7. The dispersion according to claim 2 wherein n is from 2 to 20.

8. A method of preparing an aqueous dispersion according to claim 2 comprising the steps of:
   a) Preparation of a mixture comprising components A and B;
   b) Dissolution of the mixture prepared in step a) in an anhydrous organic solvent, of which not more than 5 g are soluble in 100 g of water at room temperature;
   c) Mixing the solution obtained in step b) with water or an aqueous solution of an acid;
   d) Homogenization of the mixture obtained in step c); and
   e) Removal of 90 to 100% of the organic solvent used in step b),
   wherein step a) and/or step c) are carried out with co-use of an auxiliary which is chosen from the group consisting of a dispersant, a mixture of dispersants, polyvinyl alcohol (PVA) and guar meal (GuM).

9. The method according to claim 8, wherein the solution prepared in step b) comprises 5 to 50% by weight of polyorganosiloxanes.

10. The method according to claim 9, wherein the solution prepared in step b) comprises 10 to 40% by weight of polyorganosiloxanes.

11. The method according to claim 8 wherein the mixture obtained in step c) is homogenized using high-pressure homogenization.

12. A method of treating fiber material comprising applying the aqueous dispersion of claim 2 onto the fiber material and drying the fiber material.

13. The method according to claim 12, wherein the fiber material is a fabric.

14. The method according to claim 13 wherein the fabric is selected from the group consisting of a woven, knit and nonwoven.

* * * * *